(12) United States Patent
Yabu et al.

(10) Patent No.: US 6,570,899 B1
(45) Date of Patent: May 27, 2003

(54) GAS LASER DEVICE

(75) Inventors: Takayuki Yabu, Hiratsuka (JP); Takanobu Ishihara, Oyama (JP); Shunsuke Yoshioka, Oyama (JP)

(73) Assignee: Komatsu Ltd., Tokyo (JP)

( * ) Notice: Subject to any disclaimer, the term of this patent is extended or adjusted under 35 U.S.C. 154(b) by 49 days.

(21) Appl. No.: 09/648,630

(22) Filed: Aug. 28, 2000

(51) Int. Cl.[7] .............................. H01S 5/00; H01S 3/22
(52) U.S. Cl. ............................ 372/50; 372/58; 372/61
(58) Field of Search ............................... 372/50, 58, 61

(56) References Cited

U.S. PATENT DOCUMENTS 4,959,840 A * 9/1990 Akins et al. .................. 372/57
5,377,215 A * 12/1994 Das et al. ..................... 372/58
5,771,258 A * 6/1998 Morton et al. ................ 372/58

FOREIGN PATENT DOCUMENTS

JP  6-132582  5/1994

* cited by examiner

Primary Examiner—Paul Ip
Assistant Examiner—Cornelius H Jackson
(74) Attorney, Agent, or Firm—Armstrong, Westerman & Hattori, LLP.

(57) ABSTRACT

A gas laser device including a dust filter with which a flow rate of laser gas flowing between discharge electrodes is approximately uniform in a longitudinal direction of the discharge electrodes without a variation with time is provided. For this purpose, the gas laser device includes a laser chamber (2) containing laser gas, a pair of discharge electrodes (5, 5) disposed inside the laser chamber (2) to face to each other for exciting a laser medium by discharge to thereby oscillate laser light, a fan (14) for circulating the laser gas to send the same to an area between the discharge electrodes (5, 5), and a dust filter (12) for eliminating dust generated inside the laser chamber (2), and has a configuration in which a filter inlet port (15), which is formed in an inner wall (2A) of the laser chamber (2) and guides the laser gas into the dust filter (12), is formed to be approximately vertical to the inner wall (2A) of the laser chamber (2).

2 Claims, 7 Drawing Sheets

GAS LASER DEVICE

TECHNICAL FIELD

The present invention relates to a gas laser device, and articularly relates to a gas laser device including a dust filter or eliminating dust generated in a laser chamber.

BACKGROUND ART

A dust filter for eliminating dust generated inside a laser chamber in a laser device such as an excimer laser device and a fluorine laser device is conventionally known and is disclosed in, for example, Japanese Patent Laid-open No. 6-132582. FIG. 10 shows a configuration of a section in a side view of an excimer laser device 101 disclosed in Japanese Patent Laid-open No. 6-132582, and FIG. 11 shows a section taken along the line 11—11 in FIG. 10. FIG. 11 is illustrated so that the vertical direction is reversed.

In FIG. 10 and FIG. 11, an excimer laser device 101 includes a laser chamber 102 containing laser gas being a laser medium. A pair of discharge electrodes 105 and 105 for causing discharge to happen to excite laser gas and oscillating laser light are disposed to face to each other inside the laser chamber 102. Further, inside the laser chamber 102, a flow-through fan 121 for circulating the laser gas inside the laser chamber 102 to send it to an area between the discharge electrodes 105 and 105, and a heat exchanger 103 for cooling the laser gas heated between the discharge electrodes 105 and 105 are respectively placed at predetermined positions.

Window holders 110 and 110 are provided at both front and rear end portions of the laser chamber 102. A front and rear windows 107 and 109 for transmitting the laser light are respectively fixed at tip end portions of the window holders 110 and 110. Labyrinths 111 and Ill are placed between the laser chamber 102, and the windows 107 and 109.

Inside the laser chamber 102, the discharge electrodes 105 and 105 arc worn by discharge, and very small metal powder, halogenide thereof and the like are generated. The excimer laser device 101 includes a dust filter 112 for eliminating the dust. A filter case 114 including filter elements 113 and 113 therein is connected to an outer wall 102B of the laser chamber 102. The laser chamber 102 and the filter case 114 arc communicated with each other via a filter inlet port 115 provided at approximately a center portion in a longitudinal direction of the discharge electrodes 105 and 105 and a filter outlet port 116 provided at both end portions of the laser chamber 102.

A flow line of the laser gas which is circulated inside the laser chamber 102 by the flow-through fan 121 driven by a motor 120 is shown by the arrows G in FIG. 10 and FIG. 11. Part of the laser gas G circulated by the flow-through fan 121 is drawn from the filter inlet port 115 into the filter case 114, as shown by the arrow G1, and separates into a left and right side to pass through the filter elements 113. Thereby, the dust mixed in the laser gas G1 is caught by the filter elements 113 and 113. The laser gas G1 having the dust eliminated to be clean is discharged to the insides of the window holders 110 and 110 and passes through the labyrinths 111 to return into the laser chamber 102.

As shown in FIG. 10, the filter inlet port 115 is provided at a corner of an inner wall 102A of the laser chamber 102, and forms a receiving port like a funnel relative to the laser gas G. Thereby, the laser gas G1 is passed into the filter case 113 from the filter inlet port 115 as much as possible and thereby the amount of the dust caught is increased.

However, the prior art disclosed in Japanese Patent Laid-open No. 6-132582 has the disadvantages described below.

Specifically, in the prior art, as shown in FIG. 10, the filter inlet port 115 forms the receiving port like a funnel. The flow of the laser gas G passing near the filter inlet port 115 and flowing into between the discharge electrodes 105 and 105 is disturbed by the receiving port. In addition, since the filter inlet port 115 is provided only at approximately the center portion in the longitudinal direction of the discharge electrodes 105 and 105 as shown in FIG. 11, such disturbance selectively occurs at approximately the center portion in the longitudinal direction of the discharge electrodes 105 and 105. As a result, at approximately the center portion of the longitudinal direction of the discharge electrodes 105 and 105, the average flow rate sometimes reduces to be lower than at the other points. Such reduction of the flow rate sometimes occurs as a variation with time, and the phenomenon in which the flow rate suddenly reduces and thereafter returns to the original value sometimes happens.

When there is ununiformity in the flow rate distribution of the laser gas G between the discharge electrodes 105 and 105 in the longitudinal direction of the discharge electrodes 105 and 105, discharge is disturbed and becomes unstable at the points at which the flow rate is slow, thus causing the disadvantages that the power of the laser light is reduced and no more energy can be inputted. If the flow rate of the laser gas G is varied with time, when the flow rate is low as described above, the power of the laser light is reduced and the variation of the power with time is increased.

SUMMARY OF THE INVENTION

The present invention is made to eliminate the above disadvantages of the prior art, and its object is to provide a gas laser device in which a flow rate of laser gas flowing between discharge electrodes is approximately uniform in a longitudinal direction of the discharge electrodes without a variation with time.

In order to attain the above object, a gas laser device according to the present invention includes a laser chamber containing laser gas;

a pair of discharge electrodes disposed inside the laser chamber to face to each other for exciting a laser medium by discharge to thereby oscillate laser light, a fan for circulating the laser gas to send the same to an area between the discharge electrodes, and a dust filter for eliminating dust generated inside the laser chamber; and has a configuration in which a filter inlet port, which is formed in an inner wall of the laser chamber and guides the laser gas into the dust filter, is formed to be approximately vertical to a flow line of the laser gas flowing inside the laser chamber.

According to the above configuration, the filter inlet port seldom disturbs the flow of the laser gas flowing inside the laser chamber. Accordingly, the flow rate of the laser gas in the longitudinal direction of the discharge electrodes is seldom lowered at a specific point or seldom varied by being influence by the filter inlet portion. Thereby, it becomes possible to obtain the flow of the laser gas with the flow rate being always fixed and stable, and thus the discharge becomes stable and the output of the laser light also becomes stable.

Further, a gas laser device may include a laser chamber containing a laser medium, a pair of discharge electrodes disposed inside the laser chamber to face to each other for exciting the laser medium by discharge to thereby oscillate laser light, a fan for circulating laser gas to send the same to an area between the discharge electrodes, and a dust filter for eliminating dust generated inside the laser chamber; and may have the configuration in which a filter inlet port, which is formed in an inner wall of the laser chamber and guides the laser gas into the dust filter, is formed over approximately an entire area in a longitudinal direction of the discharge electrodes.

According to the above configuration, the filter inlet port has approximately uniform influence on the flow rate distribution of the laser gas over the entire area in the longitudinal direction of the discharge electrodes. Accordingly, the flow rate of the laser gas in the longitudinal direction of the discharge electrodes seldom is reduced at a specific point or varied by the influence of the filter inlet port.

Furthermore, a gas laser device may include a laser chamber containing a laser medium, discharge electrodes disposed inside the laser chamber to face to each other for exciting the laser medium by discharge to thereby oscillate laser light, a fan for circulating laser gas to send the same to an area between the discharge electrodes, a dust filter for eliminating dust generated inside the laser chamber, and a guide vane with an inlet port thereof being placed at a fan discharge portion of the fan over approximately an entire area in a longitudinal direction of the discharge electrodes, which guides the laser gas discharged from the fan into a filter inlet port of the dust filter formed in an inner wall of the laser chamber.

According to the above configuration, the laser gas discharged from the fan is uniformly drawn into the inlet port of the guide vane over approximately the entire area in the longitudinal direction of the discharge electrodes. Thereby, the influence exerted on the laser gas by the filter inlet port becomes approximately uniform relative to the longitudinal direction of the discharge electrodes, and thus the flow rate of the laser gas seldom reduces at a specific point or varies.

BEST MODE FOR CARRYING OUT THE INVENTION

Preferred embodiments according to the present invention will be explained in detail below with reference to the drawings.

Figure 1:
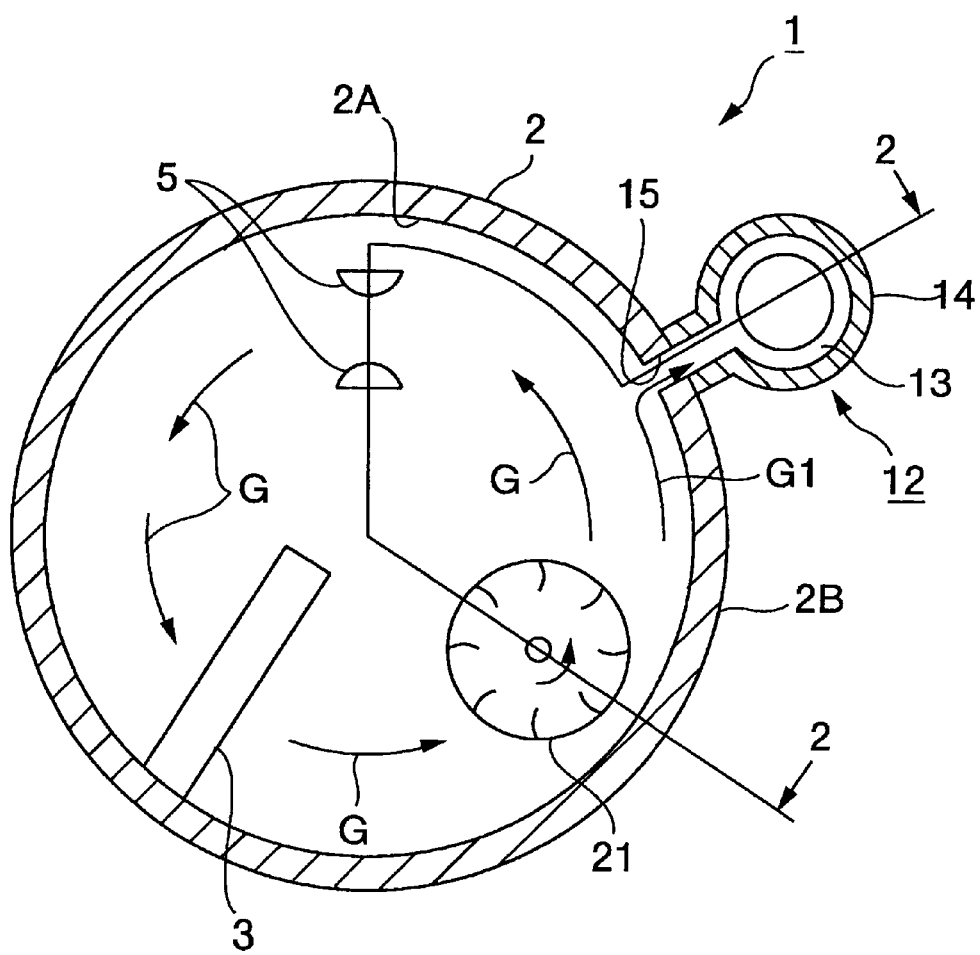
FIG. 1 is a side sectional view of an excimer laser device according to a first embodiment of the present invention.
Figure 2:
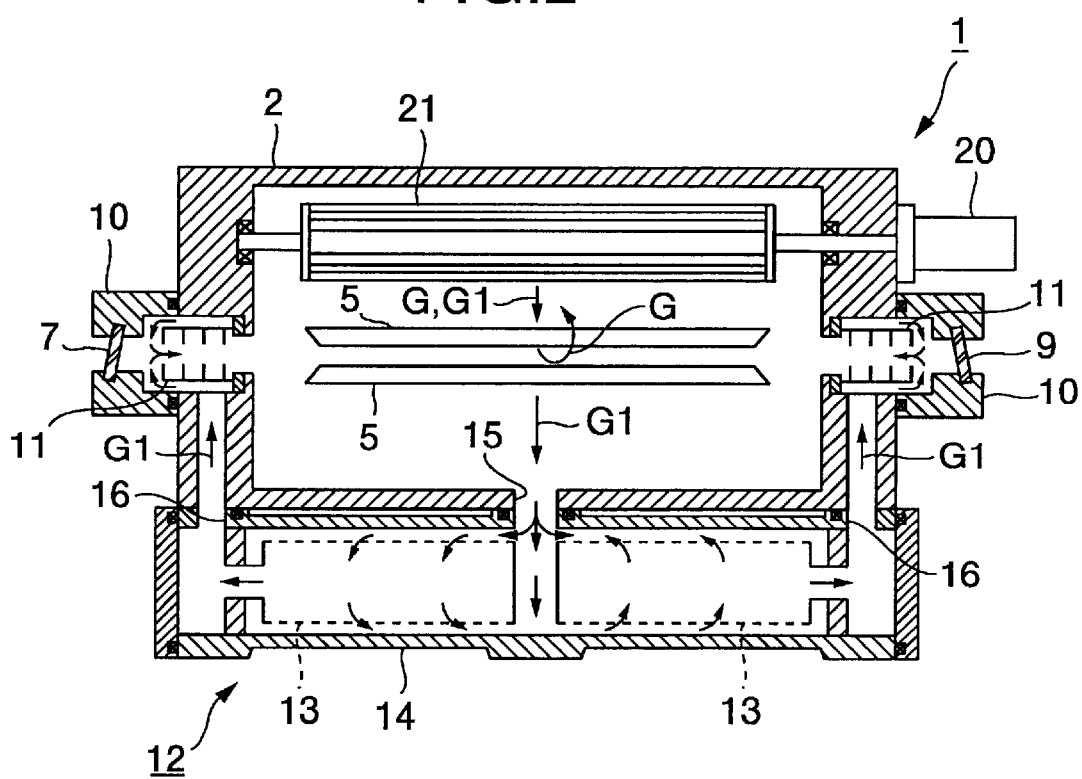
FIG. 2 is a sectional view taken along the line 2—2 in FIG. 1.

Initially, a first embodiment will be explained. FIG. 1 shows a configuration of a section of an excimer laser device according to the first embodiment viewed from the side, and FIG. 2 is a sectional view taken along the line 2—2 in FIG. 1. FIG. 2 is illustrated so that the vertical direction is reversed.

In FIG. 1 and FIG. 2, an excimer laser device 1 includes a hollow cylindrical laser chamber 2 containing laser gas being a laser medium. A pair of discharge electrodes 5 and 5 for initiating discharge to excite the laser gas and for oscillating laser light is disposed so as to face to each other. At predetermined positions inside the laser chamber 2, respectively placed are a flow-through fan 21 for circulating laser gas inside the laser chamber 2 and sending it to between the discharge electrodes 5 and 5, and a heat exchanger 3 for cooling the laser gas heated between the discharge electrodes 5 and 5.

Window holders 10 and 10 are protuberantly attached at a front and a rear portion of the laser chamber 2 on the extension line in a longitudinal direction of the discharge electrodes 5 and 5, and a front and rear windows 7 and 9 are respectively attached at tip end portions of the window holders 10 and 10. Hollow labyrinths 11 are placed inside the window holders 10 to catch dust generated inside the laser chamber 2 and prevent dust from entering the window holders 10 and 10 and attaching to the windows 7 and 9. A front mirror and a rear mirror not illustrated are disposed in front of and behind the window holders 10 and 10.

Inside the laser chamber 2, the discharge electrodes 5 and 5 are worn by discharge to thereby generate very small dust. The excimer laser device 1 includes a dust filter 12 for eliminating the dust. The dust filter 12 includes filter elements 13 and 13 for catching dust, and a filter case 14 connected to an outer wall 2B of the laser chamber 2 and having the filter elements 13 and 13 therein. The laser chamber 2 and the filter case 14 are communicated with each other via a filter inlet port 15 provided at approximately a center portion in the longitudinal direction of the discharge electrodes 5 and 5 in an inner wall 2A of the laser chamber 2, and via a filter discharge port 16 provided at both end portions of the laser chamber 2.

The arrow G shows a flow line of the laser gas, which is circulated inside the laser chamber 2 by the flow-through fan 21 driven by a motor 20, in the following drawings. As shown in FIG. 1, the filter inlet port 15 is formed to be approximately vertical to the inner wall 2A of the laser chamber 2. Part of the laser gas G is drawn through the filter inlet port 15 by static pressure of the flow-through fan 21 to enter the filter case 14 and separates into the left and right side to pass the filter elements 13 as shown by the arrow G1. Thereby, dust mixed into the laser gas G1 is caught by the filter elements 13 and 13. The laser gas G1 which has the dust being eliminated to be clean is discharged into the window holders 10 and 10, passes through the labyrinths 11, and returns into the laser chamber 2. In this situation, it is preferable to form the filter inlet port 15 at the position at which the static pressure of the flow-through fan 21 becomes the largest.

As described above, since the filter inlet port 15 is formed to be approximately vertical to the inner wall 2A of the laser chamber 2, the filter inlet port 15 is approximately vertical to the flow line G of the laser gas flowing inside the laser chamber 2. As a result, the filter inlet port 15 seldom disturbs the flow of the laser gas G. Accordingly, even at approximately the center portion in the longitudinal direction of the discharge electrodes 5 and 5 at which the filter inlet port is formed, the flow rate of the laser gas G between the discharge electrodes 5 and 5 seldom becomes lower than those at the other spots. The flow rate variation with time is also reduced.

Figure 3:
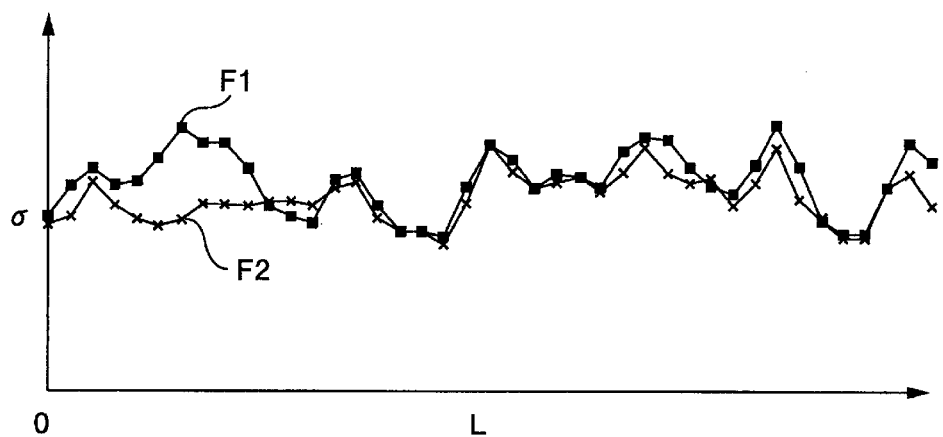
FIG. 3 is a graph showing uniformity of a flow rate of laser gas according to the first embodiment.

Irregularity of the flow rate distribution between the discharge electrodes is shown in FIG. 3. In FIG. 3, the horizontal axis represents a distance L from the center portion in the longitudinal direction of the discharge electrodes 5 and 5, and the vertical axis represents a standard deviation σ of the flow rate per second (1 ms sampling) at each spot. Specifically in FIG. 3, the smaller the standard deviation σ is, the less the variation of the flow rate with time becomes. Further, a data group F1 plotted at "■" represents the standard deviation σ with use of a filter inlet port 115 according to the prior art, while a data group F2 plotted at "X" represents the standard deviation σ with use of the filter inlet port 15 according to the fist embodiment. As shown in FIG. 3, it can be understood that in the first embodiment the standard deviation σ is especially smaller in the vicinity of the center portion in the longitudinal direction (L=0) and that the flow rate with less flow rate variation with time can be obtained.

As explained above, according to the first embodiment, it becomes possible to make the flow rate distribution uniform in the area between the discharge electrodes 5 and 5 in the longitudinal direction thereof and to reduce the variation of the flow rate with time. As a result, discharge is seldom disturbed, and the power of the laser light is stabilized. Further, since the disturbance of discharge is reduced, it becomes possible to further input energy to the laser medium, and thus improvement in power of the laser light can be expected.

Figure 4:
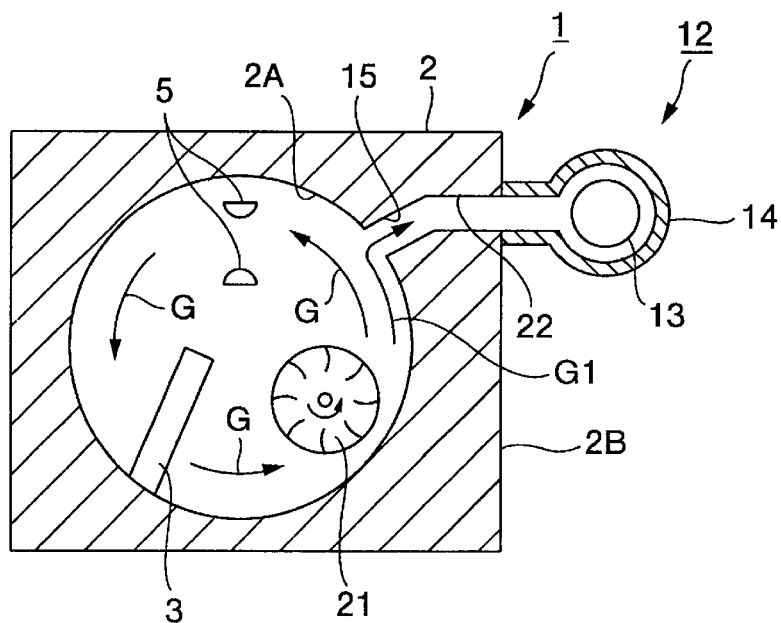
FIG. 4 is a side sectional view showing another configuration example of the excimer laser device according to the first embodiment.
Figure 5:
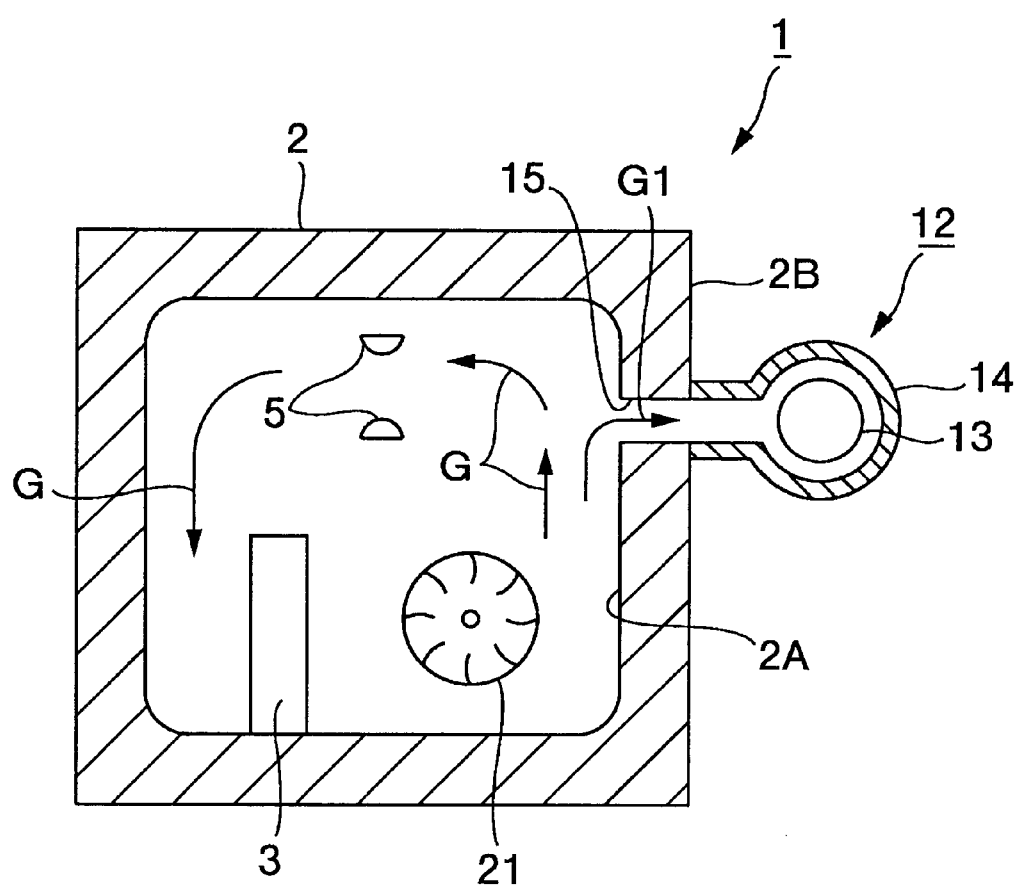
FIG. 5 is a side sectional view showing another configuration example of the excimer laser device according to the first embodiment.

In FIG. 4 and FIG. 5, the other configuration examples of the excimer laser device 1 according to the first embodiment are shown. In FIG. 4, the laser chamber 2 is constructed by cutting out the inner portion of a metal lump in a square pole form, such as aluminum, to be a cylindrical form and providing a lid portion not illustrated on a top portion thereof. The filter inlet port 15 of the dust filter 12 is provided approximately vertically to the inner wall 2A of the laser chamber 2 as in FIG. 1. As a result, the filter inlet port 15 is approximately vertical to the flow line G of the laser gas.

An approximately horizontal inlet passage 22 is formed at the filter inlet port 15 toward the filter case 14 fixed at the outer wall 2B of the laser chamber 2. The laser gas G1 is forced into the filter inlet port 15 by static pressure of the flow-through fan 21, then passes through the inlet passage 22 and has dust removed by the filter elements 13 to be discharged into the window holders 10. As a result, since the filter inlet port 15 makes approximately a right angle with the flow line G of the laser gas, the filter inlet port 15 seldom disturbs the flow of the laser gas G, and thus the flow rate of the laser gas G in the longitudinal direction of the discharge electrodes 5 and 5 can be made uniform. In addition, it is possible to make the maximum height of the filter case 14 not more than the maximum height of the laser chamber 2, thus reducing the excimer laser device 1 in size.

Further, in FIG. 5, the laser chamber 2 is constructed by cutting out the inner portion of a metal lump in a square pole form, for example, of aluminum, into a square pole form having a curved surface on each ridge line. The filter inlet port 15 of the dust filter 12 is provided approximately vertically to the inner wall 2A of the laser chamber 2. As a result, since the filter inlet port 15 also makes approximately a right angle with the flow line G of the laser gas, the flow rate of the laser gas G in the longitudinal direction of the discharge electrodes 5 and 5 can be also made uniform in this laser chamber.

Figure 6:
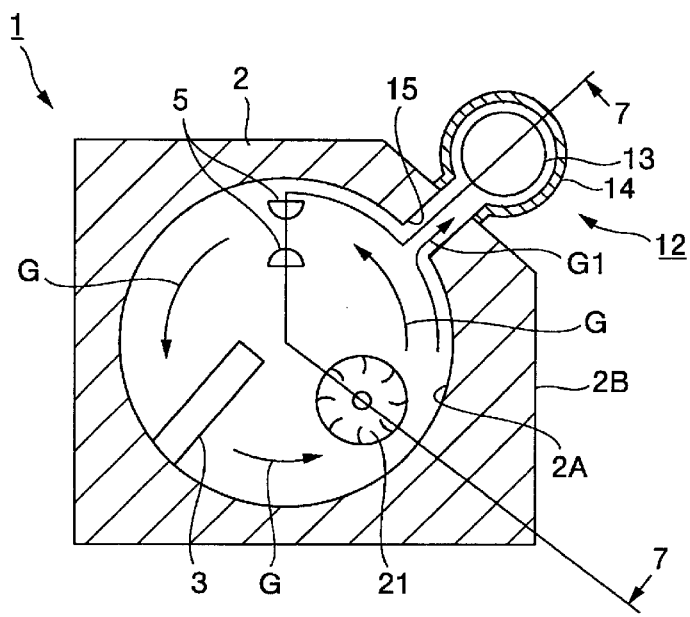
FIG. 6 is a side sectional view of an excimer laser device according to a second embodiment of the present invention.
Figure 7:
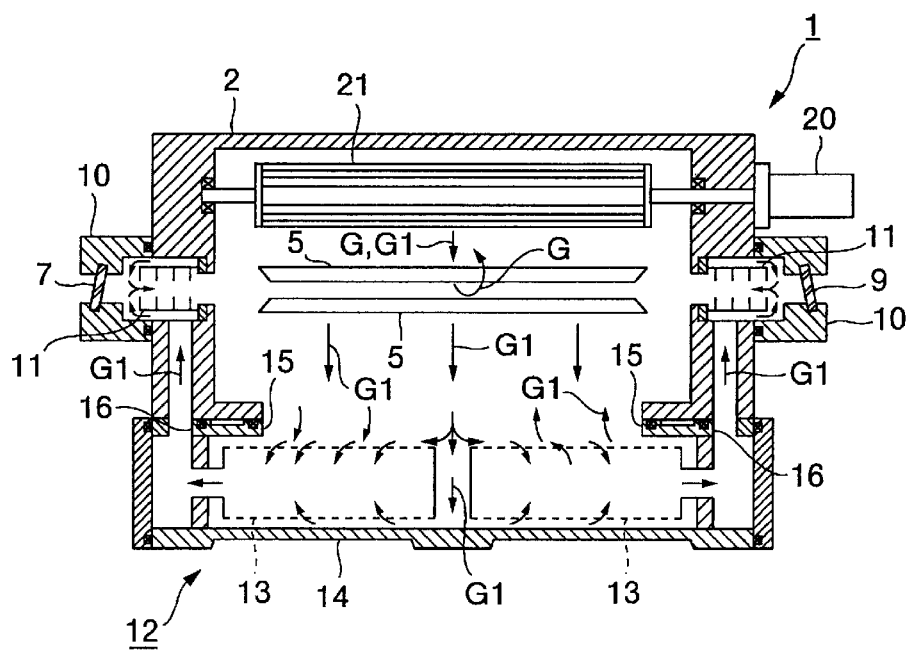
FIG. 7 is a sectional view taken along the line 7—7 in FIG. 6.

Next, a second embodiment will be explained. FIG. 6 shows a configuration of a section of an excimer laser device according to the second embodiment viewed from the side, and FIG. 7 shows a section taken along the line 7—7 in FIG. 6. FIG. 7 is illustrated so that the vertical direction is reversed.

In FIG. 6 and FIG. 7, a filter inlet port 15 of a dust filter 12 is provided to be long and narrow to extend over almost the entire length of discharge electrodes 5 and 5 in the longitudinal direction of the discharge electrodes 5 and 5. Laser gas G1 is drawn almost uniformly relative to the longitudinal direction of the discharge electrodes 5 and 5 from the long narrow filter inlet port 15, then passes through the filter elements 13 and has dust being eliminated to be discharged toward the window holders 10. As a result, an influence of the filter inlet port 15 on the flow of gas laser becomes approximately uniform or the like over the longitudinal direction of the discharge electrodes 5 and 5. Accordingly, the distribution of the gas flow rate becomes uniform, and it seldom happens that the flow rate at a specific point becomes lower or disturbed with time. Specifically, discharge is stabilized and it is possible to improve and stabilize the power of the laser light.

Figure 10:
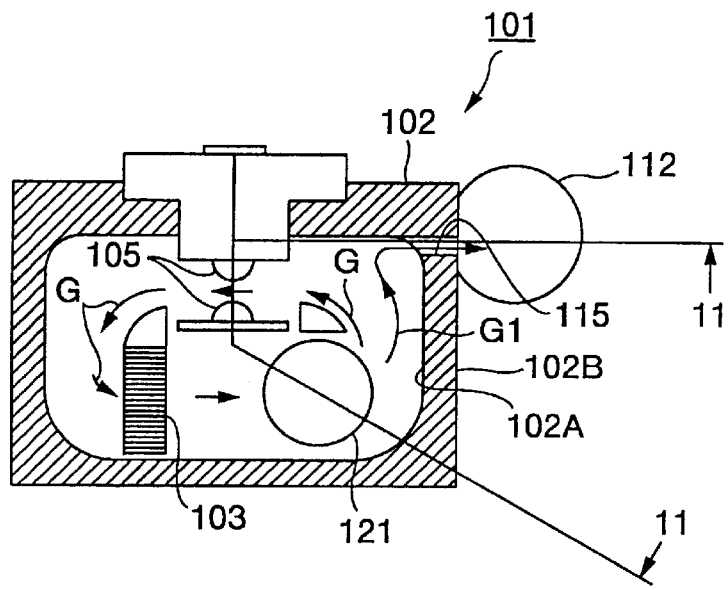
FIG. 10 is a side sectional view of an excimer laser device according to a prior art.
Figure 11:
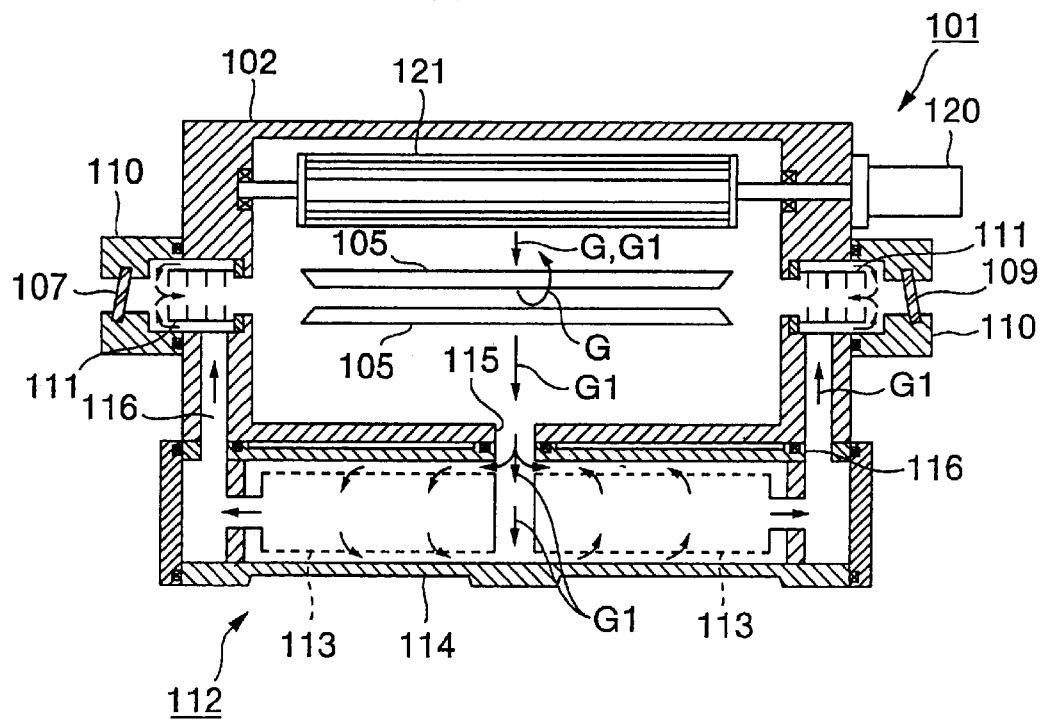
FIG. 11 is a sectional view taken along the line 11—11 in FIG. 10.

As shown in FIG. 6, the filter inlet port 15 that is explained in the second embodiment becomes approximately vertical to an inner wall 2A of a laser chamber 2 as in the first embodiment. As a result, the filter inlet port 15 becomes approximately vertical to a flow line G of laser, as, and thus an influence of the filter inlet port 15 on the flow rate of the laser gas G is reduced. However, this is not restrictive, and the filter inlet port 15 may be funnel-shaped as in the filter inlet port 15 in the prior art in FIG. 10.

Figure 8:
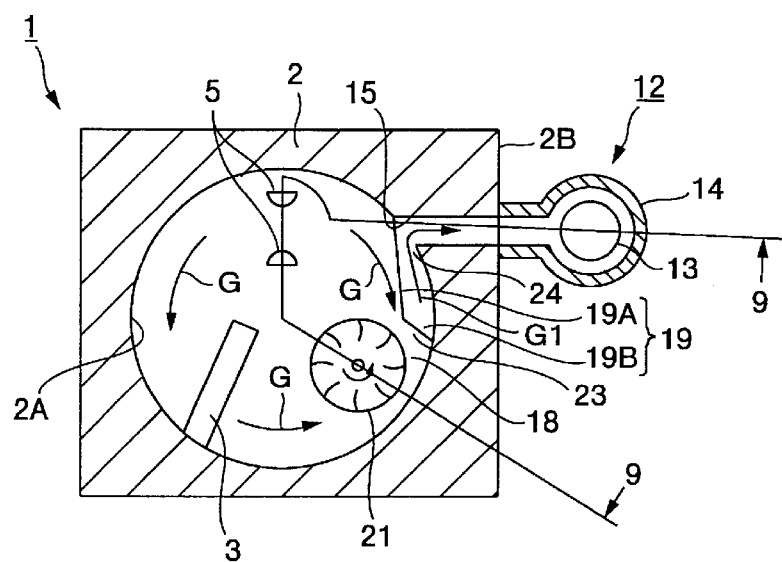
FIG. 8 is a side sectional view of an excimer laser device according to a third embodiment of the present invention.
Figure 9:
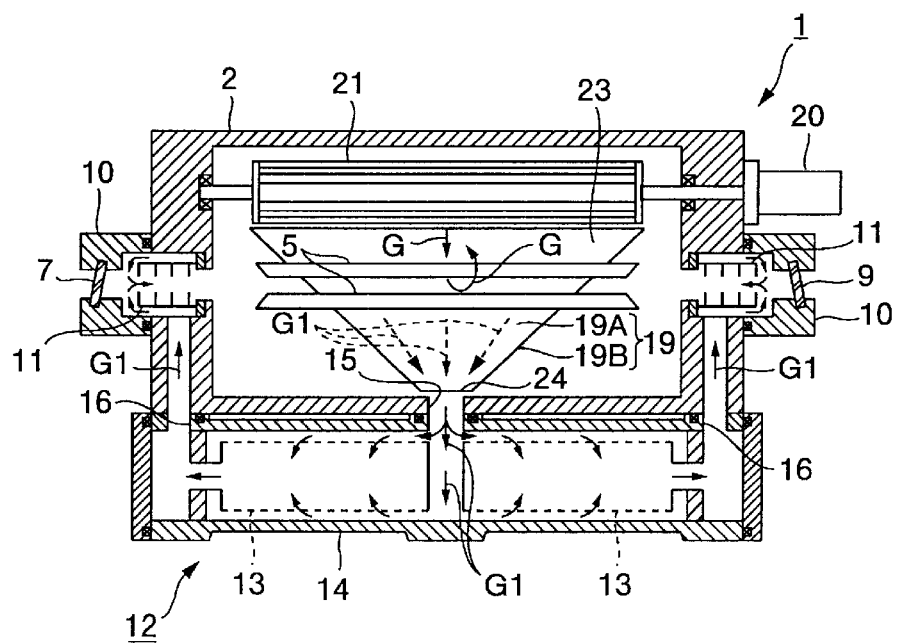
FIG. 9 is a sectional view taken along the line 9—9 in FIG. 8.

Next, a third embodiment will be explained. FIG. 8 shows a configuration of a section of an excimer laser device according to the third embodiment viewed from the side, and FIG. 9 shows a section taken along the line 9—9 in FIG. 8. FIG. 9 is illustrated so that the vertical direction is reversed.

In FIG. 8 and FIG. 9, a guide vane 19 for guiding part of laser gas (the arrows G1 in FIG. 8 and FIG. 9) discharged from a flow-through fan 21 to a dust filter 12 is provided at an inner wall 2A of a laser chamber 2. The guide vane 19 includes a vane front portion 19A provided to be along the inner wall 2A of the laser chamber 2 and a vane side portion 19B provided on a side surface of the vane front portion 19A and raised from the inner wall 2A of the laser chamber 2. As described above, a flow path of the laser gas G1 is formed between the guide vane 19 and the inner wall 2A of the laser chamber 2.

An inlet portion 23 of the guide vane 19 is provided in front of a fan outlet portion 18 of a flow-through fan 21 over an entire area in the longitudinal direction of the discharge electrodes 5 and 5. The flow path of the laser gas G1 is gradually narrowed relative to the longitudinal direction as it advances upward in FIG. 8 (downward in FIG. 9). An outlet portion 24 of the guide vane 19 communicates with a filter inlet port 15 of the dust filter 12 provided at approximately the center in the longitudinal direction of the inner wall 2A of the laser chamber 2. Part of the laser gas G1 of the laser gas G discharged from the fan discharge portion 18 of the flow-through fan 21 enters the inlet portion 23 of the guide vane 19, and passes through the aforementioned flow path to be drawn into the filter inlet port 15 of the dust filter 12.

As explained above, according to the third embodiment, the inlet portion 23 of the guide vane 19 is provided in front of the fan outlet portion 18 of the flow-through fan 21 over the longitudinal direction of the discharge electrodes 5 and 5. The flow path of the laser gas G1 which is defined by the guide vane 19 and the laser chamber 2 communicates with the filter inlet port 15 of the dust filter 12. As a result, the laser gas G1 is uniformly drawn into the inlet portion 23 of the guide vane 19 relative to the longitudinal direction of the discharge electrodes 5 and 5. Accordingly, the influence of the filter inlet port 15 on the flow rate of the laser gas G between the discharge electrodes 5 and 5 becomes almost uniform over the longitudinal direction of the discharge electrodes 5 and 5. Specifically, distribution of the gas flow rate becomes uniform relative to the longitudinal direction of the discharge electrodes 5 and 5, and it seldom happens that the flow rate at a specific point becomes lower or disturbed with time.

Each of the aforementioned embodiments is explained with the excimer laser device 1 cited as an example, but it is not restrictive, and it is applicable to every kind of gas laser device, such as a fluorine laser device, which includes the dust filter 12 for eliminating dust generated inside the laser chamber 2. The explanation is made only for the dust filter 12 including the filter elements 13, but it is not restrictive, and it is applicable to the gas laser device including, for example, a static dust eliminating type of the dust filter 12. The fan for circulating laser gas is explained as a flow-through fan, but it is applicable to the other types of fans.

What is claimed is:

1. A gas laser device, comprising:

a laser chamber containing a laser medium;

a pair of discharge electrodes disposed inside said laser chamber to face each other for exciting the laser medium by discharge to thereby oscillate laser light;

a fan for circulating laser gas to send the same to an area between said discharge electrodes;

a dust filter for eliminating dust generated inside said laser chamber; and a filter inlet port, which is formed in an inner wall of said laser chamber and guides the laser gas into said dust filter, wherein said filter inlet port is formed over approximately an entire length of the discharge electrodes in a longitudinal direction of said discharge electrodes, and uniformalizes velocity of the laser gas in the longitudinal direction of said discharge electrodes.

2. A gas laser device, comprising:

a laser chamber containing a laser medium;

discharge electrodes disposed inside said laser chamber to face to each other for exciting the laser medium by discharge to thereby oscillate laser light;

a fan for circulating laser gas to send the same to an area between said discharge electrodes;

a dust filter for eliminating dust generated inside said laser chamber; and a guide vane provided at an inner wall of said laser chamber and guiding the laser gas discharged from said fan into a filter inlet port of said dust filter, wherein an inlet portion of said guide vane is formed over approximately an entire area in a longitudinal direction of said discharge electrodes, in front of a fan discharge portion at which the laser gas is discharged from said fan, and uniformalizes velocity of the laser gas in the longitudinal direction of said discharge electrodes.

* * * * *